(12) United States Patent
Walker et al.

(10) Patent No.: US 9,052,758 B2
(45) Date of Patent: Jun. 9, 2015

(54) SYSTEM AND METHOD FOR DETECTING ACCIDENTAL PERIPHERAL DEVICE DISCONNECTION

(75) Inventors: David Ryan Walker, Waterloo (CA); Steven Henry Fyke, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 12/982,943

(22) Filed: Dec. 31, 2010

(65) Prior Publication Data

US 2012/0173770 A1  Jul. 5, 2012

(51) Int. Cl.
*G06F 3/00* (2006.01)
*G06F 11/00* (2006.01)
*G06F 3/038* (2013.01)

(52) U.S. Cl.
CPC ........ *G06F 3/038* (2013.01); *G06F 2203/0381* (2013.01)

(58) Field of Classification Search
None
See application file for complete search history.

(56) References Cited

U.S. PATENT DOCUMENTS

| | | | |
|---|---|---|---|
| 5,548,782 A * | 8/1996 | Michael et al. | 710/15 |
| 5,758,101 A * | 5/1998 | Pemberton | 710/302 |
| 5,781,744 A * | 7/1998 | Johnson et al. | 710/304 |
| 5,812,356 A * | 9/1998 | O'Connor | 361/179 |
| 5,991,645 A * | 11/1999 | Yuen et al. | 455/575.2 |
| 6,175,491 B1 * | 1/2001 | Park | 361/679.57 |
| 6,519,669 B1 * | 2/2003 | Yanagisawa | 710/304 |
| 6,560,711 B1 * | 5/2003 | Given et al. | 726/34 |
| 6,674,358 B1 * | 1/2004 | Tinsley | 340/7.63 |
| 7,996,579 B2 * | 8/2011 | Hahn et al. | 710/15 |
| 8,064,593 B1 * | 11/2011 | Dobie | 379/395.01 |
| 2003/0013499 A1 * | 1/2003 | Aotake et al. | 455/568 |
| 2003/0065857 A1 * | 4/2003 | Lin | 710/302 |
| 2004/0070499 A1 * | 4/2004 | Sawinski | 340/568.1 |
| 2005/0265565 A1 * | 12/2005 | Sakemoto et al. | 381/123 |
| 2007/0026906 A1 | 2/2007 | MacFarlane et al. | |
| 2007/0123216 A1 * | 5/2007 | Cantini et al. | 455/411 |
| 2007/0266194 A1 | 11/2007 | Hahn et al. | |
| 2008/0119241 A1 * | 5/2008 | Dorogusker et al. | 455/573 |
| 2008/0195021 A1 * | 8/2008 | Roger et al. | 604/4.01 |
| 2009/0043919 A1 * | 2/2009 | Takimoto | 710/16 |
| 2009/0251435 A1 * | 10/2009 | Westerman et al. | 345/173 |
| 2010/0150573 A1 | 6/2010 | Furuyama | |
| 2010/0272252 A1 * | 10/2010 | Johnson et al. | 379/430 |
| 2010/0298029 A1 * | 11/2010 | Jang | 455/557 |
| 2010/0310087 A1 * | 12/2010 | Ishida | 381/74 |

OTHER PUBLICATIONS

"Cs4201/cs4202 Headphone Jack Sensing Using Gpio"; Datasheet Directory; online: http://www.datasheetdir.com/Cs4201-cs4202-Headphone-Jack-Sensing-Using-Gpio+Application-Notes; accessed online May 28, 2010; printed Feb. 11, 2011; 3 pages.
"Intelligent Sending With Ambient Light and Optical Proximity Sensors: Application Reference Guide"; Avago Technologies; 2008; online: http://www.avagotech.com/docs/AV00-0151EN; accessed online May 28, 2010; printed Feb. 11, 2011; 16 pages.
"iPhone Technology"; Apple.com; online: http:www.apple.com/iphone/iphone-3gs/high-technology.html; accessed May 28, 2010; printed May 31, 2010; 2 pages.
Extended European Search Report from corresponding European Patent Application No. 10197475.6; mailed May 23, 2011; 7 pages.
Canadian Examiners Report, Application No. 2,762,737, Dated Jul. 10, 2014.

* cited by examiner

*Primary Examiner* — Michael Sun
(74) *Attorney, Agent, or Firm* — Ridout & Maybee LLP

(57) ABSTRACT

A detection device for detecting the manner in which a peripheral device is removed from an electronic device is proposed. The detection device can be on the peripheral device or the electronic device and detects whether the peripheral device was removed in a manner that indicates the removal was intentional or unintentional.

22 Claims, 5 Drawing Sheets

SYSTEM AND METHOD FOR DETECTING ACCIDENTAL PERIPHERAL DEVICE DISCONNECTION

TECHNICAL FIELD

The present disclosure relates generally to detection of a manner of removal of a periphery device from an electronic device.

BACKGROUND

Many periphery devices may be removeably attached to electronic devices. For example, headphones may be attached to an electronic device such as a computer or handheld electronic device through an audio jack. Those periphery devices can be removed intentionally or accidentally. In some cases, when an audio jack is removed from an electronic device, the audio from the electronic device is output to a speaker on the electronic device in lieu of the headphones. In some cases, the audio is turned off in response to removal of the audio jack.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
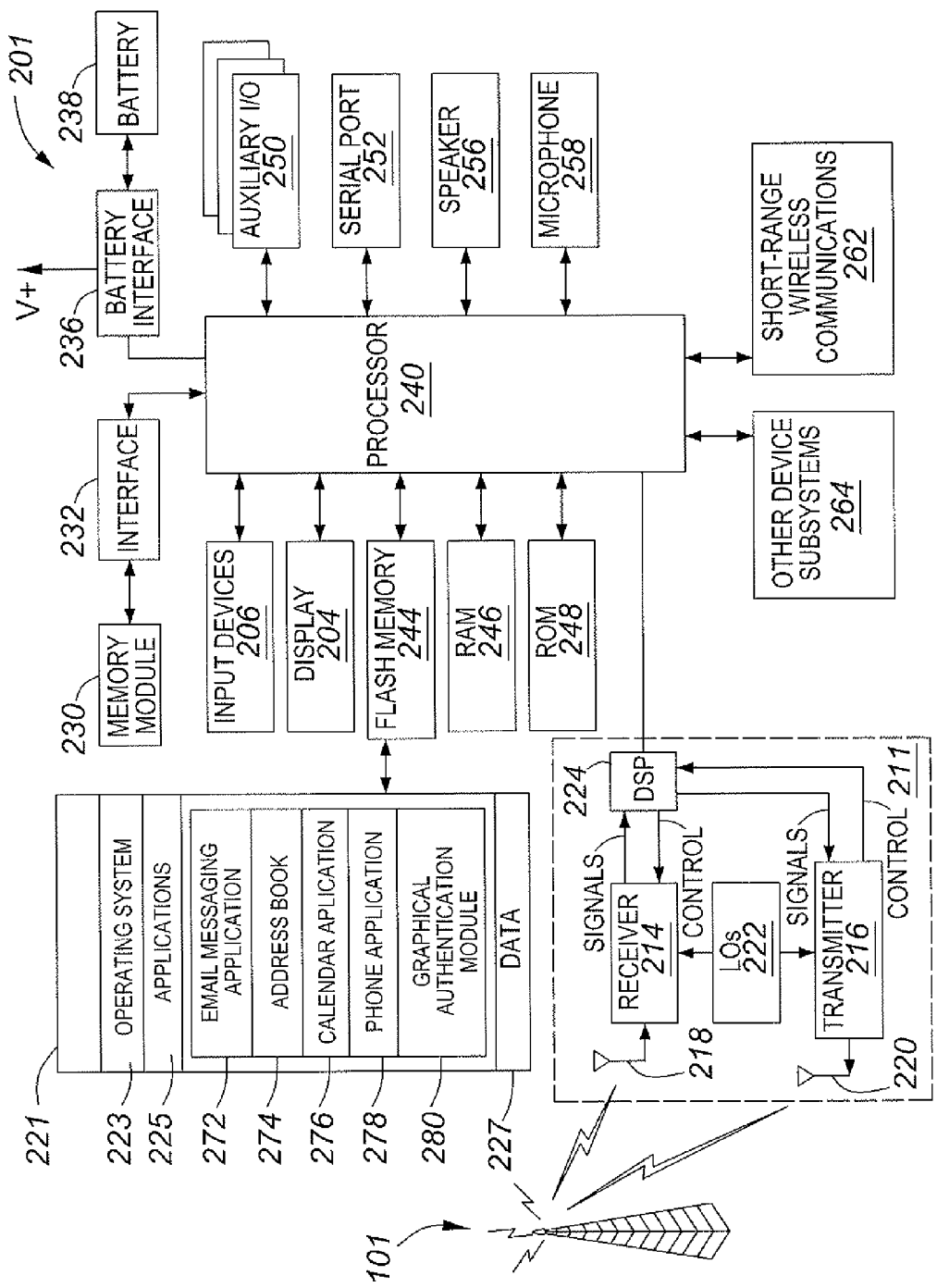
FIG. 1 is a block diagram illustrating a mobile communication device in accordance with one example embodiment of the present disclosure.

A peripheral device connected to an electronic device can become accidentally removed or disconnected from the electronic device. In some cases, removal or disconnection of the peripheral device results in the electronic device performing a function automatically. In cases where the removal is accidental or unintended, it may not be desirable to perform that function automatically. The present disclosure presents a detection system that can detect a manner in which a peripheral device is removed or disconnected. If the manner in which the peripheral device is removed or disconnected can be distinguished, the behaviour of the electronic device in response to the removal can then be tailored to suit the manner of removal.

In a non-limiting example, a touch sensor on a connector of the peripheral device detects whether the connector was touched during the removal. Touching the connector during the removal in some embodiments is interpreted as an indicator of intentional removal and removal with no touch is interpreted as unintentional. In the case where the peripheral device is headphones, the electronic device can be configured to output audio to a speaker system if the removal included a touch on the connector and not to output the audio to the speaker system if the removal did not include a touch on the connector.

In another non-limiting example, an optical sensor detects whether some tangible thing, for example a hand, was near the connector during the removal.

In one aspect, there is provided a detection system for detecting a manner in which a peripheral device is removed from an electronic device, the detection system comprising: a detector configured to sense an action during removal of the peripheral device from the electronic device; and an output interface configured to output a signal corresponding to the action sensed.

In another aspect, there is provided a connector for connecting a peripheral device to an electronic device, the connector comprising: a detector configured to sense an action during removal of the peripheral device from the electronic device; and an output interface configured to output a signal corresponding to the action sensed.

In another aspect, there is provided a system comprising: an electronic device; a peripheral device connectable to the electronic device; a detector configured to sense an action during removal of the peripheral device from the electronic device; and an output interface configured to output a signal corresponding to the action sensed.

Embodiments of the present application are not limited to any particular operating system, electronic device architecture, server architecture, or computer programming language. The present application can be applied to any electronic device, including but not limited to a computer, a mobile electronic device, a television, and an audio system. Many embodiments may be especially useful with portable electronic devices, including handheld devices (devices that are sized to be held or carried in a human hand). Likewise, the present application can be applied to any peripheral device, including but not limited to headphones, a charger, a printer, a display, a mouse, a speaker, a camera, and a keyboard. Colloquially speaking, an electronic device is typically perceived as the "main" device and a peripheral is typically perceived as an "add-on" that modifies or improves the functionality of the electronic device or makes the electronic device more useful. Generally speaking, a peripheral is typically perceived as an "add-on" that is physically coupled to the electronic device by a physical connector. The present application is not limited to the particular kind of connector between the electronic device and the peripheral. The concepts described herein may be applicable to any number of ports, interfaces, jacks, sockets and the like. The connector may facilitate an electrical connection or an optical connection, or a combination of both, for example. As will be discussed below, the connector is of a kind that the peripheral can be readily connected to and disconnected from (i.e., removed from) the electronic device by the user, typically with no need for any tools. Furthermore, the connection between the electronic device and the peripheral need not be a direct connection, but may include one or more intermediate elements. In some circumstances, an electronic device may have a peripheral, and may itself also be a peripheral. For example, a video camera may be physically coupled to a computer, and speakers may be physically coupled to the video camera. In such a case, the speakers may be a peripheral with respect to both the camera and the computer, and the camera may be a peripheral with respect to the computer.

Reference is now made to FIG. 1 which illustrates an exemplary embodiment of an electronic device in which example embodiments described in the present disclosure can be applied. The electronic device in FIG. 1 is a portable electronic device, and in particular, a mobile two-way communication device 201 having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem. Notably, such devices are used by a number of people in their professional and personal capacities for processing and managing information and communications that may be confidential, and that such use may occur in public venues.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions. Auxiliary input/output (I/O) subsystems 250 and data port 252 may be examples of ports at which peripherals may be connected to the device 201.

The device 201 may comprise a touch screen display in some embodiments. The touch screen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller. In some embodiments, a touch screen is integrated directly with the display. In still other embodiments, a touch screen is placed behind the display.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations of a wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

Figure 2:
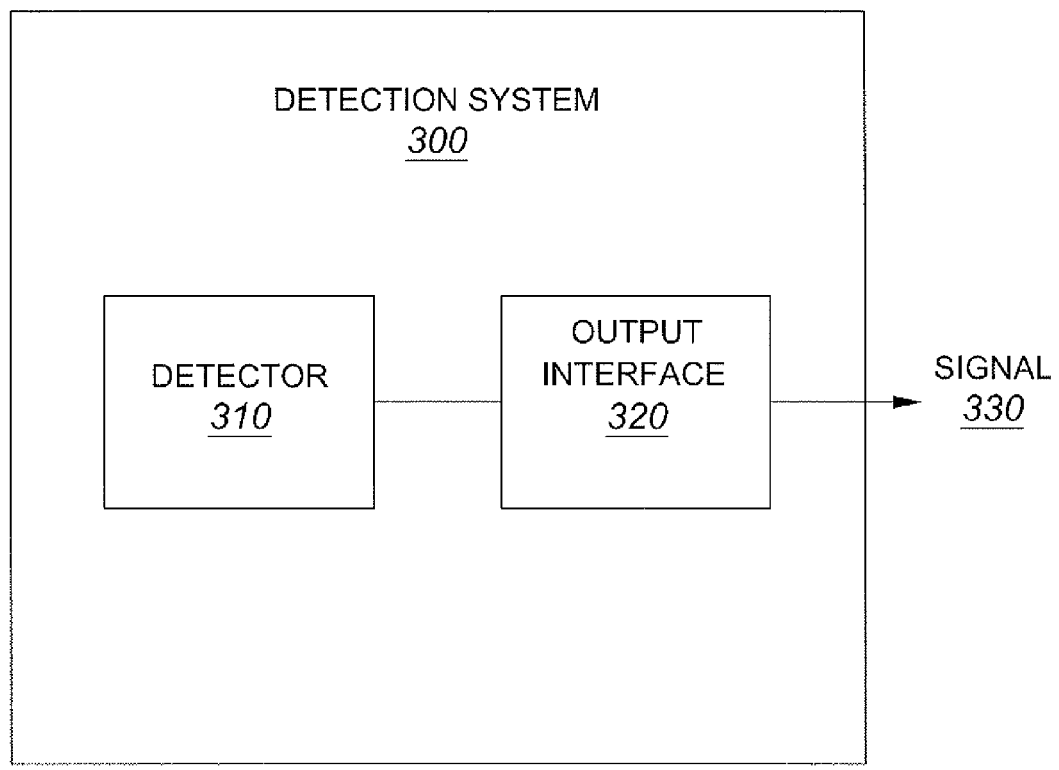
FIG. 2 is a block diagram illustrating a detection system in accordance with one example embodiment of the present disclosure.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and graphical authentication module 280. Example embodiments of the graphical authentication module 280 will be discussed in detail later herein. It is recognized that the graphical authentication module 280 and its various components as described herein can form a discrete module running on the device 201, or the functions of the graphical authentication module 280 can be distributed on the device 201 as separate modules or integrated within other existing modules as desired. Such discrete or distributed implementations all fall within the embodiments of the graphical authentication module 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). As previously noted, auxiliary input/output (I/O) subsystems 250 may include a port at which a peripheral may be connected or removed by the user. In FIG. 1, auxiliary input/output (I/O) subsystems 250 has a more general sense, however, and may also include elements that are generally not readily connected or removed by a user, for example, a pointing or navigational input device such as a clickable trackball or touch pad or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 also includes a power source, which in FIG. 1 is represented as a battery 238, even though any power source may be used. The battery 238 is typically one or more rechargeable batteries that may be charged, for example, through charging circuitry coupled to a battery interface such as the serial data port 252. Such charging circuitry may be an example of a peripheral. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A set of applications that control basic device operations, including data and voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

Referring now to FIG. 2, a detection system 300 in accordance with one example embodiment will now be described. The detection system 300 is for detecting a manner in which a peripheral device is removed from an electronic device. The detection system 300 includes a detector 310 and an output interface 320. The detector 310 is configured to sense an action during removal of the peripheral device from the electronic device, (In general, when an element is configured to perform a function, the element is capable of performing the function.) The output interface 320 is configured to output a signal 330 corresponding to (or as a function of) the action sensed. In some embodiments, the detector 310 is located on the electronic device. In other embodiments, the detector 310 is located on the peripheral device. In some embodiments, the detector 310 is located on a connector for connecting the peripheral device to the electronic device. In some embodiments the output interface 320 is located on the peripheral device. In other embodiments the output interface 320 is located on the electronic device. In still other embodiments, the detection system 300 is module that can be placed near one of the electronic device and the peripheral device. In some embodiments the detector 310 and the output interface are co-located. In other embodiments, the detector 310 and output interface 320 are located apart from each other. For example, one could be on the electronic device and the other could be on the peripheral device. The signal 330 may be transmitted in any fashion (such as by wire, wirelessly, by infrared, optically, sonically) to the electronic device, or the peripheral, or both. As will be discussed below, the electronic device, or the peripheral, or both, may behave in response to the signal 330. For example, the electronic device may behave in one fashion if the signal indicates there was an action sensed characteristic of an intentional peripheral removal, and may behave in a different fashion if the signal indicates there was no action sensed characteristic of an intentional peripheral removal.

Examples of actions that can be detected in various embodiments include but are not limited to touching a connector, coming close to a connection point, and fast or slow removal of a connector from a port. Many types of detectors are used in various embodiments. The type of detector used depends on the type of action to be sensed.

A touch sensor that senses if a portion of the peripheral device is touched or if pressure is applied to the sensor during removal of the peripheral device from the electronic device is used in some embodiments. Non-limiting examples of touch sensors include a capacitive pad, a mechanical switch, a force transducer and a piezoelectric pad.

In some embodiments, a proximity sensor that senses if an object comes within a pre-determined distance of the detector (that is, a distance that was established expressly or inferentially at some time prior to the sensing of the object) during removal of the peripheral device is used. Non-limiting examples of a proximity sensor include an optical sensor, an infrared sensor and a capacitive sensor.

In some embodiments, an accelerometer is used to detect the speed at which a connector is removed. In some cases removal above a specified or pre-determined speed will be interpreted as accidental or unintentional.

In an example embodiment, the detection system 300 further comprises a processor configured to compare the action sensed (such as touch, movement, pressure) to a pre-determined action (such as a benchmark touch, movement or pressure that was specified expressly or inferentially prior to the action being sensed), and in response to the action matching the pre-determined action, to provide the electronic device with an instruction corresponding to the pre-determined action. In some implementations, the pre-determined action may be a threshold, for example, application of a force above a specified number of Newtons constitutes a touch, and otherwise there is no touch. In other implementations, the pre-determined action may be a number of touches that indicate a manner of touching. For example, application of a force above a specified number of Newtons on opposite sides of a connector constitutes a touch (indicating that the connector is not merely being touched but is being pinched), and otherwise there is no touch. In still other implementations, the pre-determined action may comprise a range rather than a threshold, or the predetermined action may take into account multiple actions (such as touch and movement). Notably, there may be cases in which there may be little or no action that is actually sensed. In some embodiments, a processor on the electronic device or the peripheral device is configured to do the comparison and provide the instruction. For example, processor 240 described with reference to FIG. 1 could be used. An application or module containing instructions to implement the actions could be included in a memory, such as, but not limited to, flash memory 224.

In some embodiments, the instruction is to deactivate a system of the electronic device. This could save battery power by not running systems not presently being used. The instruction to deactivate a system can be in response to an action that is interpreted as being intentional or as being unintentional. The response to an action may be customisable depending on the configuration of the electronic device and the peripheral device and user requirements. For example, an audio system of an electronic device may be deactivated in response to removal of an audio jack without touching the jack. In the case of removal of headphones, if the action sensed is not interpreted as being indicative of intentional removal, this could avoid audio being output over a speaker system. In some embodiments, the instruction may be to continue to output the audio to the port for the headphones. In some embodiments, the audio is output to the port for a limited period of time and deactivated if the audio jack is not replaced within the limited period of time. It is to be understood that the example of an audio jack is for exemplary purposes only. This type of instruction can be applied to other embodiments. For example, in the case where the peripheral device is an external display, images may continue to be output to the port for the display connection or the output of images may be deactivated in response to the action sensed or the images may be displayed on a display on the electronic display.

Similar to the embodiments described above where a processor provides instructions for the electronic device to perform a function, the output interface 320 can be configured to output a signal that results in the electronic device performing a function. In some embodiments, the output interface 320 is configured to output a deactivation signal to deactivate a system on the electronic device.

In some embodiments, the output interface 320 is a wireless transmitter. In some embodiments, the wireless transmitter is a short-range wireless transmitter, such as a Bluetooth™ device. In embodiments, where the detection system 300 is located on the peripheral device or a connector, a wireless transmitter can be used to communicate information to the electronic device after the peripheral device or connector has been removed or disconnected from the electronic device.

Other non-limiting examples of the output interface are a speaker that outputs an audio alert, a visual indicator, such as an LED (light emitting diode) light, a signal generator and any means of transmitting a signal such as but not limited to a wireless transmitter or a physical wire. In some embodiments, a coded signal is sent over an audio line of a set of headphones. In other embodiments, a microphone line on a headset is used to send data. In still other embodiments, the output interface provides a tactile response. Non-limiting examples include a vibration motor and a vibrating piezo actuator.

Figure 3:
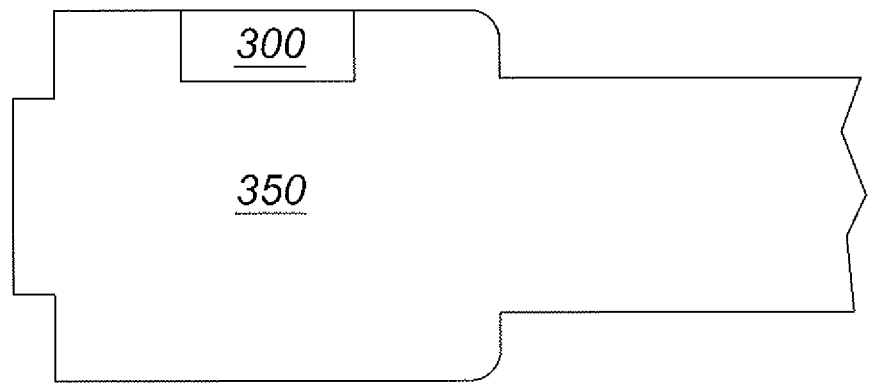
FIG. 3 is a diagram of a connector in accordance with one example embodiment of the present disclosure.
Figure 4:
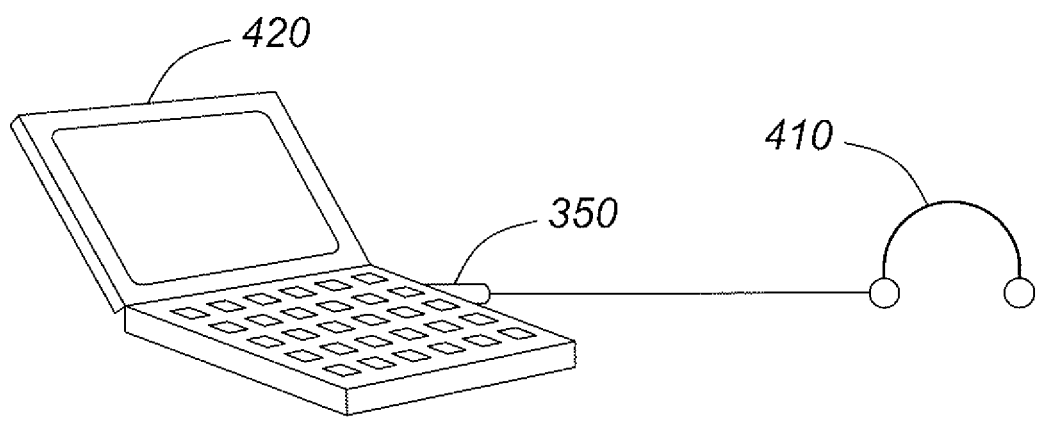
FIG. 4 is a diagram of a system in accordance with one example embodiment of the present disclosure.

Referring now to FIGS. 3 and 4, in another example embodiment a connector 350 is provided. The connector 350 is for connecting a peripheral device 410 to an electronic device 420. The connector 350 is shown in isolation in FIG. 3 and connecting the electronic device 420 to the peripheral device 410 in FIG. 4. For illustrative purposes only, in FIG. 4 the electronic device 420 is shown as a computer and the peripheral device 410 is shown as headphones. It is to be understood that the connector described herein can be applied to any electronic device and any peripheral device and is not limited to those shown in the Figures. The connector 350 comprises the detection system 300 described above with reference to FIG. 2. In some embodiments, the sensors are miniature and can be deployed such that they are unobtrusive, add negligible weight or bulk, and do not interfere with other operations. They may even be deployed so that the user is unaware of them.

Figure 5:
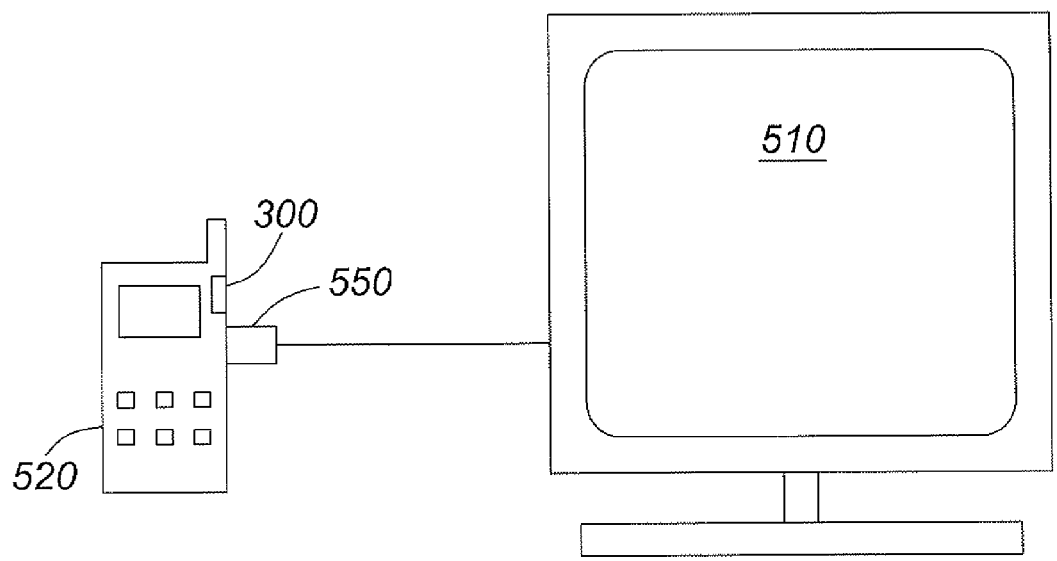
FIG. 5 is a diagram of a system in accordance with one example embodiment of the present disclosure.

As mentioned, in some embodiments, the detection system 300, or portions thereof, is located on the electronic device. An example embodiment where the detection system is located on an electronic device 520 is shown in FIG. 5. The electronic device 520 is connected to a peripheral device 510 by a connector 550. For illustrative purposes, the electronic device 520 shown is a mobile telephone and the peripheral device 510 is a display. Once again, it is to be understood that any electronic device and any peripheral device can be used.

In another embodiment a system comprising the electronic device, the peripheral device and the detection system is provided.

Figure 6:
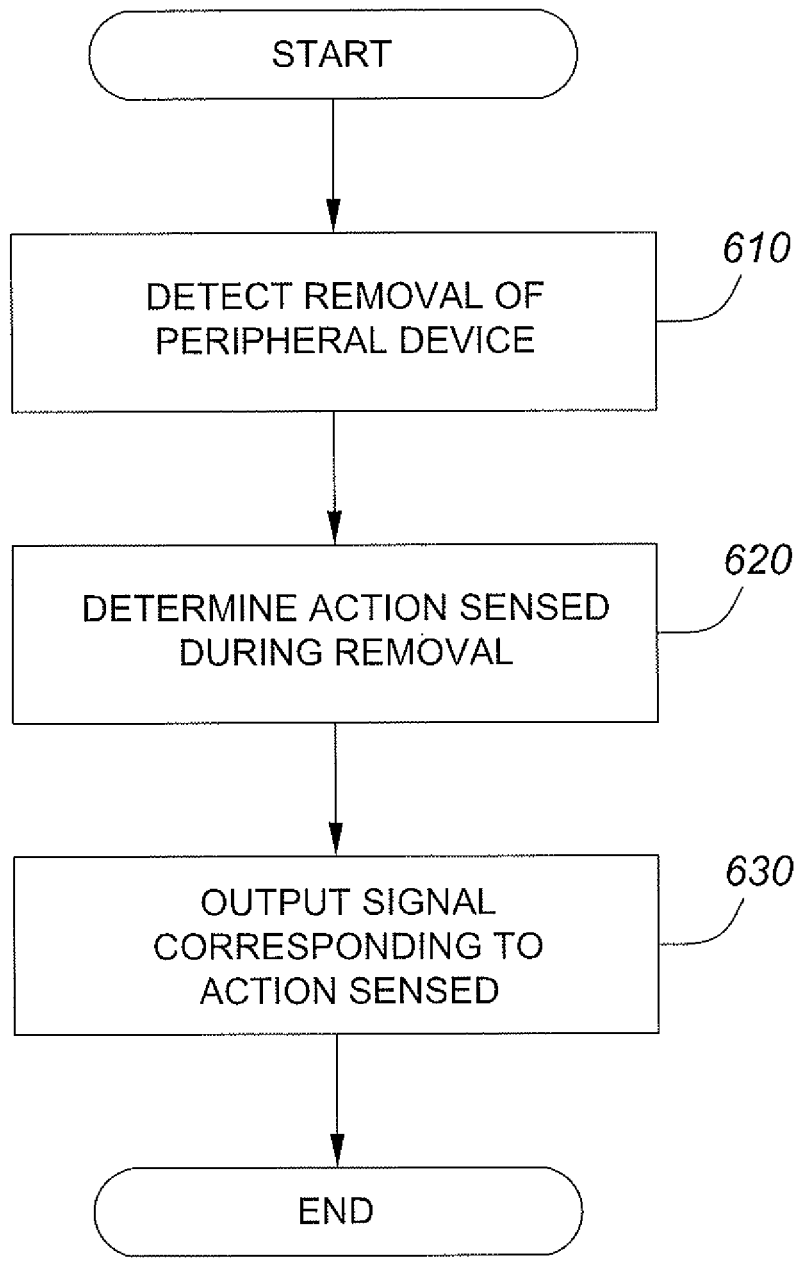
FIG. 6 is a flowchart of a method in accordance with one example embodiment of the present disclosure.

Referring now to FIG. 6, an exemplary method that can be implemented by embodiments of the systems disclosed herein will be described. For purposes of simplicity, the method will be described as carried out by an electronic device such as device 201 in FIG. 1. A comparable method may be carried out by the peripheral. At action 610, a removal of the peripheral device is detected. This detection can be made, in some implementations, by a sensor in a port on the electronic device that senses whether or not a peripheral device is connected to the port. In other embodiments the removal of the peripheral device triggers a switch indicating removal. In still other embodiments, the disconnection of an electrical connection between the electronic device and the peripheral device is detected and interpreted as removal of the peripheral device. At action 620, a determination of an action sensed during removal is made. For example, in some embodiments a determination is made as to whether or not a connector was touched. In some embodiments, a determination of the manner of touching the connector is made (e.g., whether the connector was touched on opposite sides, or pinched). In some embodiments the amount of force applied to the connector is measured. In some embodiments, the speed of removal is measured. In some embodiments, the proximity of a moving object to a point of connection during removal is determined. As discussed above, the determination involves comparison of the action sensed to a pre-determined action. At step 630, an output signal corresponding to the action sensed is output. For example, in some embodiments, if the connector is touched, a signal corresponding to intentional removal is output. In another example, if the connector was not touched during removal, a signal corresponding to unintentional removal is output. As another example, if there is no movement detected before or as the removal is sensed, a signal may be output that corresponds to a connector being yanked out, which may be deemed an unintentional removal.

In embodiments using a capacitive touch sensor, incidences of false positives may be reduced because the capacitive sensor likely will not be triggered by contact with or proximity to non-capacitive objects, such as clothing. For example, if a mobile device is placed in a pocket, objects may be in proximity of a jack, and hence the sensor, when the jack is accidentally removed. A capacitive sensor is able to detect the difference between a non-capacitive object (such as a wallet or clothing) and a capacitive object, such as a hand or finger.

Optical sensors may be better suited to larger devices, like a PC or home stereo because they are less likely to be located in a place where the optical sensor may not work, such as in a pocket.

One or more of the above embodiments may realize one or more benefits, some of which have been discussed previously. In general, the concepts described herein enable an electronic device or a peripheral of both to behave differently, depending upon whether the peripheral was removed intentionally or unintentionally. The behaviour may be a function of the signal that is output corresponding to the action sensed. It has been discovered that intention as a mental state is typically accompanied by detectable action, such as touching or movement. If the detectable action that typically accompanies an intentional removal is present, then the electronic device may behave in one way. If the detectable action that typically accompanies an intentional removal is absent, the electronic device may behave in a different way.

The different modes of behaviour may themselves be advantageous. As has been mentioned already, they may protect the user's privacy or save power, for example. The advantages that may be realized from the change in behaviour may vary from electronic device to electronic device, and from peripheral to peripheral. In the context of handheld portable electronic devices such as smart phones and tablet computers, the concepts may be especially advantageous because these devices are often used to work with confidential information in public places. Detection of an unintentional peripheral removal, and behaving accordingly, may help preserve the confidential information.

Further, the techniques described may be implemented automatically, without specific action by the user. The detection system may be implemented in an unobtrusive manner, and may even be virtually invisible to the user.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus, articles of manufacture also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A detection system for detecting a manner in which a peripheral device is removed from an electronic device, the detection system comprising:
   a detector configured to sense a type of an action during removal of the peripheral device from the electronic device, the type of action being indicative of an intentional or unintentional manner in which the peripheral device is removed; and
   an output interface configured to output a signal corresponding to whether the action sensed is indicative of an intentional or unintentional manner in which the peripheral device is removed.

2. The detection system of claim 1, wherein the detector comprises a touch sensor that senses if a portion of the peripheral device is touched by a user during removal of the peripheral device from the electronic device.

3. The detection system of claim 2, wherein the touch sensor is one of a capacitive pad, a mechanical switch, a force transducer and a piezoelectric pad.

4. The detection system of claim 1, wherein the detector is a proximity sensor that senses if an object comes within a pre-determined distance of the detector during removal of the peripheral device.

5. The detection system of claim 4, wherein the proximity sensor is one of an optical sensor, an infrared sensor and a capacitive sensor.

6. The detection system of claim 1, further comprising a processor configured to compare the action sensed to a pre-determined action and in response to the action matching the pre-determined action, to provide the electronic device with an instruction corresponding to the pre-determined action.

7. The detection system of claim 6, wherein the instruction is to deactivate a system of the electronic device.

8. The detection system of claim 6, wherein the instruction is to turn off an audio output.

9. The detection system of claim 1, wherein the output interface is a wireless transmitter.

10. The detection system of claim 1, wherein the output interface is further configured to output a deactivation signal to deactivate a system on the electronic device.

11. The detection system of claim 1, wherein the detector is located on the peripheral device.

12. The detection system of claim 1, wherein the detector is located on the electronic device.

13. A method of detecting a manner in which a peripheral device is removed from an electronic device, the method comprising:
   sensing a type of an action during removal of the peripheral device from the electronic device, the type of action being indicative of an intentional or unintentional manner in which the peripheral device is removed; and
   outputting a signal corresponding to whether the action sensed is indicative of an intentional or unintentional manner in which the peripheral device is removed.

14. The method of claim 13, wherein the sensing comprises sensing if a portion of the peripheral device is touched by a user during removal of the peripheral device from the electronic device.

15. The method of claim 13, wherein the sensing comprises sensing if an object comes within a pre-determined distance of the detector during removal of the peripheral device.

16. A system comprising:
   an electronic device;
   a peripheral device connectable to the electronic device;
   a detector configured to sense a type of an action during removal of the peripheral device from the electronic device, the type of action being indicative of an intentional or unintentional manner in which the peripheral device is removed; and
   an output interface configured to output a signal corresponding to whether the action sensed is indicative of an intentional or unintentional manner in which the peripheral device is removed.

17. The system of claim 16, wherein the detector and the output interface are located on the peripheral device.

18. The system of claim 16, wherein the detector is located on a connector for connecting the peripheral device to the electronic device.

19. The system of claim 16, wherein the detector and the output interface are located on the electronic device.

20. The system of claim 16, further comprising a processor configured to compare the action sensed to a pre-determined action and in response to the action matching the pre-determined action, to provide the electronic device with an instruction corresponding to the pre-determined action.

21. The system of claim 16, wherein the detector is a touch sensor.

22. The system of claim 16, wherein the detector is a proximity sensor.

* * * * *